Oct. 22, 1940.   N. H. F. OLSEN   2,219,140
AUTOMOTIVE VEHICLE CONSTRUCTION
Filed July 19, 1939   2 Sheets-Sheet 1

INVENTOR
N. H. F. Olsen
BY Edwin C. McRae
   E. L. Davis
   ATTORNEYS.

WITNESS
E. Fritzke

Oct. 22, 1940.　　　N. H. F. OLSEN　　　2,219,140
AUTOMOTIVE VEHICLE CONSTRUCTION
Filed July 19, 1939　　2 Sheets-Sheet 2

Patented Oct. 22, 1940

2,219,140

UNITED STATES PATENT OFFICE 2,219,140

AUTOMOTIVE VEHICLE CONSTRUCTION

Niels H. F. Olsen, Dearborn, Mich., assignor to Ford Motor Company, Dearborn, Mich., a corporation of Delaware Application July 19, 1939, Serial No. 285,243

7 Claims. (Cl. 267—11)

The object of my invention is to provide a stabilizer for motor vehicles, of simple, durable and inexpensive construction.

A further object of my invention is to provide a stabilizer which will produce improved riding qualities in a motor vehicle.

Specifically, my invention comprises means for stabilizing the front axle and wheels of the conventional automobile by resisting the rocking action of the vehicle and at the same time preventing side sway or lateral shifting of the body relative to the axles when rounding curves. This construction is especially advantageous when used in connection with cross-arm steering, as in such cases the lateral shifting of the body, upon which the steering gear is mounted, introduces an error in steering which turns the front wheels into the direction against which the lateral force is being applied. This effect is called wandering and makes for more difficult handling of the car at high speeds.

It is well known that an important function of vehicle springs is to resist rolling action of the car when the same is rounding curves. Heretofore such springs have needed to be stiffer to prevent roll than was required in order to support the car vertically. With my improved device, roll is resisted by the stabilizer so that softer springs, only capable of supporting the car, may be used. This materially improves the ride obtained.

A further object of my invention is to provide a stabilizing device for the front end of an automobile, which device coacts with the front axle so that when one side of the vehicle is raised by means of the front bumper, the adjacent wheel will be lifted off the ground by the stabilizer instead of the by the car springs. At the present time cars are so constructed that it is difficult to place a jack under either axle to raise the wheels. For this reason bumper jacks are now universally used, which jacks raise the car by the bumpers. The axles are tied to the body only by the car springs so that the body must ordinarily be raised a considerable distance before the springs will lift the wheels. With my stabilized, the wheels are positively lifted by the body so that the bumper need be raised much less to raise the wheels than with the ordinary car suspension.

Still a further object of my invention is to provide a stabilizer which resists swaying of the car by applying a torsional stress in a torsion bar and which resists lateral shifting of the car body by applying a bending stress in the ends of the torsion bar. Thus, a single bar is made to perform two separate functions, whereas, in the past such torsion bars have functioned only to prevent rolling of the car.

Still a further object of my invention is to provide an improved type of mounting for torsion bar stabilizers, which mounting assists in dampening the road shocks which might otherwise be transmitted from the wheels to the car body.

With these and other objects in view, my invention consists in the arrangement, construction and combination of the various parts of my improved device, as described in the specification, claimed in my claims, and illustrated in the accompanying drawings, in which:

Figure 1:
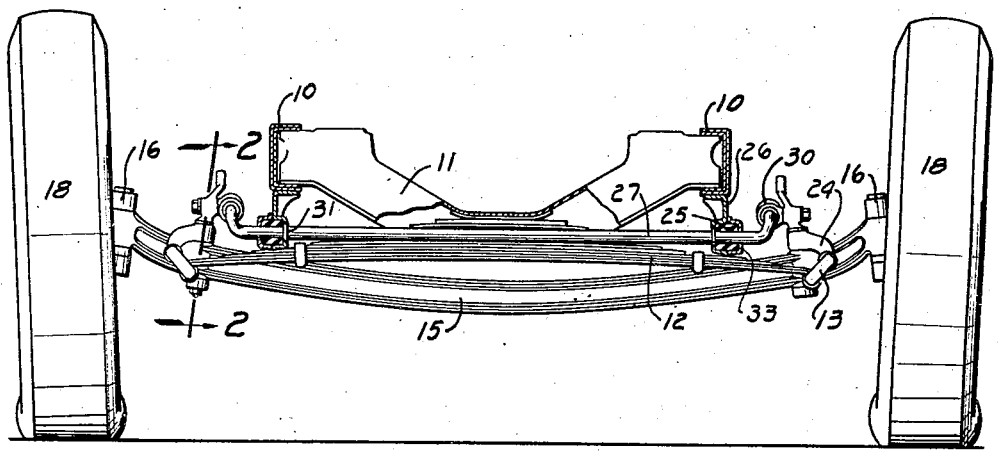
Figure 1 is a front elevation of a motor vehicle chassis incorporating my improved stabilizer, part of the front cross member and stabilizer bearings being broken away to better illustrate the construction.
Figure 4:
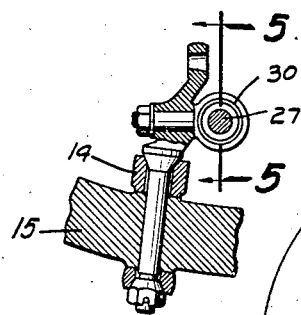
Figure 4 is a sectional view, taken upon the line 4—4 of Figure 2.

Referring to the accompanying drawings, I have used the reference numeral 10 to indicate the side members of a conventional vehicle frame, which frame is provided with a front cross member 11. A transversely extending leaf spring 12 is secured to the cross member 11 in the conventional manner with its ends extending laterally to position where it is secured to spring shackles 13. A pair of radius rods 14 have their forward ends secured to the shackles 13 with the rearward portions of the rods secured together and to a ball connection, not shown in the drawings. The ball connection is mounted to oscillate at middle portion of the frame in the conventional manner.

The forward ends of the radius rods 14, just rearwardly of where they are fastened to the spring shackle 13, are secured to the respective ends of an axle 15, which extends transversely across the front end of the car. A steering knuckle 16 is formed on each end of the axle and each is arranged to support a conventional wheel spindle 17 upon which front wheels 18 are rotatably mounted. Steering arms 19 are forged integrally with each knuckle 16 and a tie rod 20 connects the rear ends of the two arms 19 in the conventional manner.

A steering gear unit 21 having a conventional steering arm 22 is mounted on one of the side members 10 with the free end of the arm arranged to oscillate laterally upon movement of the steering wheel of the vehicle. A drag link 23 connects the free end of the steering arm 22 with the opposite spindle arm 19 to thereby oscillate the spindles 17 upon movement of the steering gear.

The foregoing construction is the standard transverse spring construction. One of the inherent characteristics of this construction is that the frame may rock around the center point of the spring when the car negotiates curves. The center of gravity of the frame and body is invariably much higher than the height of the spring 12 and consequently it exerts a rocking force upon the body which causes the body and frame to tip. Furthermore, this force also causes the frame to shift as a unit laterally. The spring shackles invariably permit a limited lateral shift and, inasmuch as the steering gear is fastened to the frame, such lateral shift produces a turning effect upon the spindle the same as movement of the steering arm 22 due to rotation of the steering wheel. My improved construction provides means for preventing both of the aforementioned disadvantages.

It will be noted from the drawings that a bracket 26 is fixedly secured to the underside of each side member 10 just forwardly of the cross member 11. An annular bushing 25 of resilient rubber is fixed in each bracket 26 by means of a cap 33, the caps, bushings, and brackets each having an annular opening therethrough which receives a torsion bar 27. The bar 27 extends across the vehicle frame with its outer ends bent rearwardly to form arms 28. An eye fitting 30 is pivotally mounted in each spring perch and fabric bushings 29 are inserted in the openings in these eyes to receive the arms 28. Rubber protecting sleeves 34 are snapped onto the arms 28 and eyes 30 to prevent dirt from affecting the bearing surfaces.

From the foregoing, it will be noted that when the frame member tends to rock so as to push one side downwardly farther than the other side, the bar 27 must twist. This construction is known in the industry as a torsion bar type stabilizer. Normal vertical movement of the frame is not resisted by the arms 28, in which case the arms simply slide back and forth in the eyes 30. It is only when the car starts to rock so that one arm is bent ahead of the other that the force is resisted by the torsion bar.

It will be noted from Figure 1 that shoulders 31 are formed upon the bar 27 adjacent to the inside of each bushing 25. When the frame moves laterally, the bar 27 must likewise move laterally. For this reason if the frame tends to shift sidewise relative to the axle, the lateral force is transmitted to each arm 28 to thereby prevent this lateral movement of the frame relative to the axle. This prevents side stresses from affecting the steering of the wheels.

Both of the aforementioned functions are accomplished herein by means of the relatively simple U-shaped bar member, whereas no single device known to the applicant has in the past been capable of resisting these two forces simultaneously.

Figure 6:
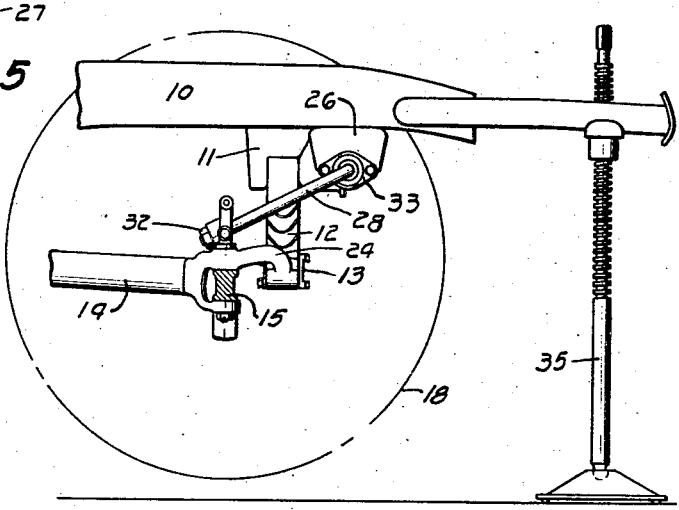
Figure 6 is a view, similar to that shown in Figure 2, of an alternate construction showing one of the front wheels being lifted from the ground by the action of a jack which is used to raise the front bumper of the car.
Figure 5:
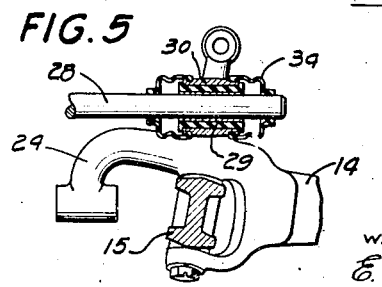
Figure 5 is a sectional view, taken upon the line 5—5 of Figure 4.
Figure 2:
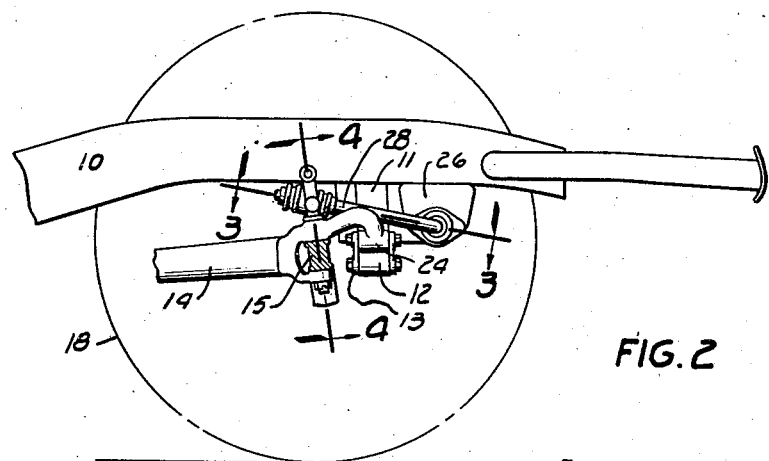
Figure 2 is a sectional view, taken upon the line 2—2 of Figure 1.
Figure 3:
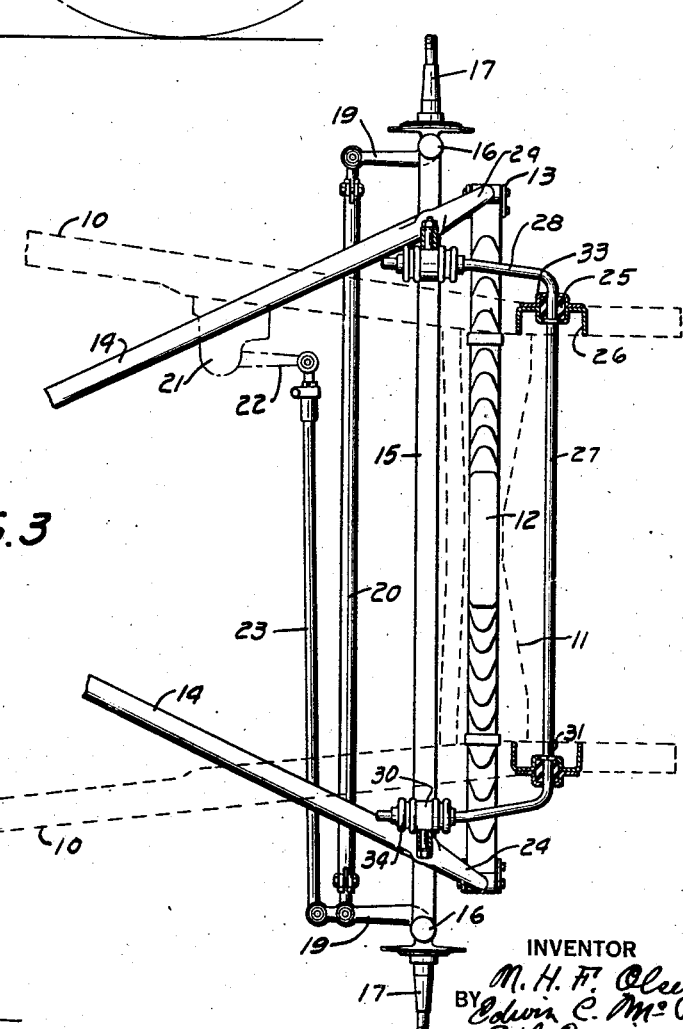
Figure 3 is a sectional view, taken upon the line 3—3 of Figure 2.

I have shown in Figure 6 an alternate construction which functions to lift the front wheels when the car is jacked up. In this construction the outer end of each arm 28 is provided with a nut 32 so placed that when the frame 10 is raised relative to the wheels above a certain point, the arms 28 slide outwardly in the eyes 30 until the nuts bear against the eyes. Normal vertical movement is permitted but when the car is elevated by means of a jack, shown by 35 in Figure 6, the nuts 32 lift the wheels and axle upwardly. The stiffness of the spring 12 when flexed in the reverse direction is not depended upon to lift the wheels off the ground. Formerly it was necessary to first lift the frame sufficiently to take up all the deflection in the spring and then to further lift the frame so that the spring would be stressed in the reverse direction sufficiently to lift the wheels and axle. This required considerable labor on the part of the person lifting the car and is in great part eliminated with this improved construction. With my improved device it is only necessary to elevate the car little more than the normal vertical springing movement of the vehicle in order to lift the wheels off the ground.

In assembling my improved stabilizer, the brackets 26 are placed on the bar and the ends of arms 28 are threaded through the flexible rubber bushings 25. The caps 33 are then screwed to the brackets. The bushings 25 being flexible may be easily forced around the bends at the ends of arm 28. The free ends of the arms 28 are then inserted into the eyes 30 and the brackets bolted to the underside of the frame members. The sleeves 34 are, of course, snapped into their positions.

Among the many advantages arising from the use of my improved construction, it may be well to repeat that rocking of the car body around the axle is resisted by torsion of the bar 27 and at the same time the lateral shifting of the body is resisted by bending stresses in the arms 28. In this way the control of the car is much improved and because of this a softer spring may be used to thus improve the riding qualities of the car.

Some changes may be made in the arrangement, construction and combination of the various parts of my improved device without departing from the spirit of my invention and it is my intention to cover by my claims such changes as may reasonably be included in the scope thereof.

I claim as my invention:

1. A stabilizer for a motor vehicle, said vehicle having a frame, an axle extending transversely across said frame, and a spring extending between said axle and said frame comprising, a torsion bar extending transversely across said frame and pivotally supported on the respective sides thereof, arms extending rearwardly from the ends of said bar, a pair of eye fittings pivotally secured to the respective ends of said axle upon axes which extend substantially parallel to said axle, the ends of said arms being slidably mounted in said eye fittings, and means associated with said bar preventing lateral movement of said bar relative to said frame.

2. A stabilizer for a motor vehicle, said vehicle having a frame, a front axle extending transversely beneath the forward end of said frame, a pair of brackets fixed to the underside of said frame at the respective sides thereof, resilient rubber bushings secured in each of said brackets, said bushings being axially aligned, a torsion bar rotatably mounted in said bushings, the ends of said bar being bent rearwardly, eye fittings pivotally secured to said axle to pivot upon axes which extend substantially parallel to said axle, the ends of said arms being slidably mounted in said eye fittings and shoulders formed on said bar which coact with said bushings to prevent lateral movement of said bar relative to said brackets and frame.

3. A stabilizer for a motor vehicle, said vehicle having a frame, an axle extending transversely beneath said frame, and a spring extending between said axle and said frame, comprising, a pair of brackets fixed to the underside of said frame at the respective sides thereof, resilient rubber bushings secured in the ends of said brackets, a torsion bar extending through said bushings and supported thereby for pivotal movement relative to said frame, the ends of said bar being bent so as to extend parallel to said frame, and eye fittings pivotally mounted upon the respective ends of said axle upon axes which extend substantially parallel to said axle, the longitudinal extending ends of said bar being slidably mounted in said fittings, and rubber sleeves extending between said eye fittings and said arms so as to protect the sliding surfaces therebetween, and means associated with said bar preventing lateral movement of said bar relative to said frame.

4. A stabilizer for a motor vehicle, said vehicle having a frame, and having wheels spring suspended beneath the respective sides of said frame so that said frame may move in a vertical direction relative to said wheels, comprising, a torsion bar extending transversely across said frame, said bar being pivotally supported upon the respective sides of said frame, arms extending longitudinally from each end of said bar, which arms are connected to said wheels against both lateral and vertical movement relative thereto, and a stop member on each of said arms which stops coact with the respective wheels so as to lift said wheels upon the frame being lifted through a distance greater than the normal vertical movement of said frame.

5. A stabilizer for a motor vehicle, said vehicle having a frame, an axle extending transversely across said frame, and a spring extending beneath said axle and frame, comprising, torsion bars extending transversely across said frame and pivotally supported on the respective sides thereof, arms extending longitudinally from each end of said bar, which arms are connected to the respective ends of said axle so as to prevent against both lateral and vertical movement of the axle relative to said arms, and a stop on the end of each of said arms, which stops coact with said axle only after the frame is raised through a greater distance than the normal movement permitted by said spring.

6. A stabilizer for a motor vehicle, said vehicle having a frame, an axle extending across said frame, and a spring extending between said axle and said frame, comprising, a torsion bar extending transversely across said frame and pivotally supported upon the respective sides thereof, arms extending longitudinally from each end of said bar, eye fittings pivotally mounted in the respective ends of said axle upon axes which extend substantially parallel to said axle, the ends of said arms extending through said eye fittings so as to be slidably connected thereto, and a stop member secured to the outer end of each of said arms, which stops coact with said fittings upon the frame being raised through a greater distance than that permitted by the normal flexing movement of springs.

7. A stabilizer for a motor vehicle, said vehicle having a frame, an axle extending transversely across said vehicle beneath said frame, and a transverse spring extending between the ends of said axle and the center of said frame, comprising, a torsion bar extending transversely across said frame and pivotally supported upon flexible rubber bushings beneath the respective sides thereof, the ends of said bar being bent rearwardly so as to extend substantially parallel to the sides of said frame, eye fittings pivotally mounted upon the ends of said axle upon axes which extend substantially parallel to said axle, the respective ends of said bars being slidably mounted in said fittings, means associated with said bar preventing lateral movement of said bar relative to said frame, and a stop fixed on the end of each arm, which coacts with the adjacent eye member upon the frame being lifted relative to the axle thru a greater distance than that permitted by the normal flexing movement of said spring.

NIELS H. F. OLSEN.